United States Patent
Moore

(10) Patent No.: US 6,894,099 B2
(45) Date of Patent: May 17, 2005

(54) STABILIZED BORAX BASED FIRE RETARDANT SYSTEM

(75) Inventor: Richard Moore, Madore (CA)

(73) Assignee: Ecoseal Technologies Inc., Surrey (CA)

( * ) Notice: Subject to any disclaimer, the term of this patent is extended or adjusted under 35 U.S.C. 154(b) by 121 days.

(21) Appl. No.: 10/187,793

(22) Filed: Jul. 3, 2002

(65) Prior Publication Data

US 2004/0006167 A1 Jan. 8, 2004

(51) Int. Cl.$^7$ ................................. C08K 3/38
(52) U.S. Cl. ............... 524/405; 427/288; 427/297; 427/351; 427/369; 427/421; 427/429
(58) Field of Search ................. 427/288, 297, 427/369, 421, 429, 351; 524/405

(56) References Cited

U.S. PATENT DOCUMENTS

| | | | | |
|---|---|---|---|---|
| 3,055,852 A | * | 9/1962 | Youse | 428/336 |
| 3,816,307 A | | 6/1974 | Woods | 252/8.1 |
| 3,861,425 A | | 1/1975 | Clark | 138/149 |
| 3,897,387 A | | 7/1975 | O'Shaughnessy | 524/281 |
| 3,926,905 A | * | 12/1975 | Nose et al. | 524/417 |
| 3,945,962 A | | 3/1976 | Clark | 260/29.6 MM |
| 4,539,045 A | | 9/1985 | Wagner | 106/18.13 |
| 5,151,127 A | | 9/1992 | Thompson | 106/15.05 |
| 5,266,618 A | | 11/1993 | Watanabe et al. | 524/405 |
| 5,314,530 A | | 5/1994 | Wierer et al. | 106/2 |
| 5,430,081 A | | 7/1995 | Ohmae et al. | 524/100 |

FOREIGN PATENT DOCUMENTS

| | | |
|---|---|---|
| CN | 1076947 | 10/1993 |
| DE | 4309143 A1 | 9/1994 |
| EP | 0364729 A1 | 4/1990 |
| EP | 0906934 A1 | 4/1999 |
| EP | 0921159 A1 | 6/1999 |
| JP | 5098144 A2 | 4/1993 |
| JP | 10030056 A2 | 2/1998 |
| JP | 11181266 A | 7/1999 |

* cited by examiner

Primary Examiner—Judy M. Reddick
(74) Attorney, Agent, or Firm—Oyen Wiggs Green & Mutala

(57) ABSTRACT

This invention relates to a novel stabilized borax based fire retardant system. More particularly, this invention pertains to a borax containing fire retardant system which is stabilized and resists leaching and oxidation when combined as a coating or an impregnation with a suitable substrate such as wood, plastic or the like. A stabilized borate suspension useful for providing fire retardancy to a substrate comprising: (a) a liquid polyacrylate suspension; (b) a liquid polytetrafluoroethylene suspension; (c) a borate powder; (d) a liquid vinyl acetate co-polymer suspension; and (e) sufficient water to incorporate components (a), (b), (c) and (d) to form an emulsion.

12 Claims, No Drawings

STABILIZED BORAX BASED FIRE RETARDANT SYSTEM

FIELD OF THE INVENTION

This invention relates to a novel stabilized borax based fire retardant system. More particularly, this invention pertains to a borax containing fire retardant system which is stabilized and resists leaching and oxidation when combined as a coating or an impregnation with a suitable substrate such as wood, plastic or the like.

BACKGROUND OF THE INVENTION

Borates, including zinc borate, sometimes associated with aluminum hydrates, have been used in fire resistant coatings and materials for many years. Bisodium borate ($Na_2B_4O_7 \cdot 10H_2O$) (often called borax) has also been used as a fire retardant and as a preservative for various types of materials including wood, plastic and the like. Bisodium borate is extremely hygroscopic and in its hygroscopic form is vulnerable to solubilization and leaching from the substrate. This is true when it is used as a fire retardant or preservative, thereby reducing effectiveness. Many attempts have been made over the years to stabilize bisodium borate so that it resists leaching from the substrate but such attempts have not been entirely successful.

A number of patents have issued over the years disclosing borates as a fire retardant or preservative.

U.S. Pat. No. 3,897,387, O'Shaughnessy, granted Jul. 29, 1997, and reissued Jan. 15, 1980 as RE30,193, discloses a fire retardant agent comprising calcium or magnesium mineral borates or calcium or magnesium meta borate and a halogen source; a method of rendering organic materials generally of a hydrocarbon nature, such as plastic and rubber polymers, cellulosics, resins and oils, etc., fire retardant by introducing into said organic materials calcium or magnesium mineral borates or calcium or magnesium meta borate and a halide; articles, laminates, coatings, foams, papers, fabrics, etc. containing calcium or magnesium mineral borates or calcium or magnesium meta borate and a halide of atomic weight greater than 19.

U.S. Pat. No. 3,861,425, Clark, granted Jan. 21, 1975, and its continuation-in-part, U.S. Pat. No. 3,945,962, Clark, granted Mar. 23, 1976, disclose a water base, hardenable coating composition for use on the inner or air conducting surfaces of fibrous glass thermal insulation employed in heating, cooling or ventilating conduits. The coating comprises, by weight: 70 to 90 percent of aluminum or magnesium hydrate; 5 to 20 percent of a binder such as vinyl acrylic latex or polyethylene vinyl acetate latex; and 1 to 10 percent of a flame retardant such as a sodium borate or boric acid.

U.S. Pat. No. 3,816,307, Woods, granted Jun. 11, 1974, discloses a composition for rendering resin compositions fire retardant consisting essentially of a dry mixture of particles of a finely divided Group I metal borate or ammonium borate, said borate having an average particle size of from 0.1 to about 25 microns, and antimony oxide, the weight ratio of said borate to antimony oxide being no greater than 4:1.

Often, the borates are combined with other compounds or substances. The following patents disclose borates in combination with other substances.

DE 4,309,142, Bayer AG, published Sep. 29, 1994, relates to flameproofed moulding compositions comprising aromatic polycarbonates, ABS graft polymers, copolymers and a flame-protection combination comprising red phosphorus, phosphate or phosphonate esters, antimony trioxide or boron phosphate, and tetrafluoroethylene polymer, characterised in that the red phosphorus and the phosphorus compounds are added as a batch in pastille (briquette) form, to the use of the moulding compositions for the production of mouldings, and to a process for incorporating the mixture of phosphorus and phosphorus compounds into the moulding composition.

EP 906,934, Ausimont S.p.A., published Apr. 7, 1999, discloses thermoplastic fluoropolymer compositions, flexible, without whitening, comprising: (1) ETFE or ECTFE fluoropolymers modified with hydrogenated monomers; (2) one or more hydrogenated plasticizers; (3) one or more inorganic fire retardants; (4) optionally other ingredients such as fillers, smoke retarders, intumescent agents, pigments, lubricants, organic fire retardants and thermal stabilizers.

U.S. Pat. No. 5,266,618, Watanabe et al., granted Nov. 30, 1993, discloses a flame-retardant resin composition comprising the following components (A), (B), (C) and (D): (A) 100 parts by weight of a thermoplastic resin comprising (1) a polycarbonate resin, or (2) a polycarbonate resin and a non-polycarbonate resin; (B) from 0.1 to 40 parts by weight of a phosphorus compound; (C) from 0.001 to 40 parts by weight of a boron compound; and (D) from 0.01 to 5 parts by weight of a polyorganosiloxane and/or from 0.001 to 5 parts by weight of a fluorine resin.

EP 0,364,729, General Electric, published Apr. 25, 1990, discloses that the flame retardant properties of polymers with an aromatic main chain can be improved by incorporating therein a fluorine compound in combination with a boron compound.

EP 0,921,159, General Electric, published Jun. 9, 1999, discloses flame retardant compositions comprising a polymer of carbon monoxide, and at least one olefin, and a flame retarding quantity of a melamine compound.

JP 11,181,266 Kanegafuchi Chemical Industry, Co., Ltd., Jul. 6, 1999, discloses fire-resistant thermoplastic resin compositions containing boron compounds comprising: (a) 100 parts of a resin blend consisting of 50–100 wt. % of a polycarbonate resin and 0–50 wt. % of a polyester resin; (b) 1–50 parts of a boron compound selected from boron oxide, zinc borate, and zinc borate hydrate; (c) 0.1–50 parts of talc; and (d) 0.005–1 part of a fluoro resin. The ratio of the boron compound and talc is 99:1 to 30:70. The fluoro resin can be a fluorinated polyolefin with average particle size <700 .mu.m.

JP 10,030,056, Mitsubishi Eng. Plastics KK, Feb. 3, 1998, discloses a novel polycarbonate resin composition (I) comprising: (1) 100 parts wt. polycarbonate resin and 5–50 wt. % (B) glass fibre; (2) 1–10 parts wt. (C) phosphoric acid ester(s); (3) 0.1–5 parts wt. (D) boron compound(s); and (4) 0.01–2 parts wt. (E) fibril polytetrafluoroethylene.

JP 5,098,144, Denki Kagaku Kogyo KK, Apr. 20, 1993, discloses a composition comprising (A) a polycarbonate type thermoplastic resin; and (B) a flame retardant agent comprising (a) an organic phosphor compound, (b) an inorganic boron compound and (c) a halogen containing compound. Preferably, the composition comprises a polyorganosiloxane and/or fluorine containing resin. The composition comprises a thermoplastic resin besides the polycarbonate resin.

U.S. Pat. No. 5,314,530, Wierer et al., granted May 24, 1994, discloses coating compositions for producing watertight, vapor-permeable and flame-retardant coatings, comprising a vinyl chloride copolymer or vinyl acetate/ethylene dispersion, flameproofing agents, foam stabilizer and optionally crosslinkers. The invention further relates to a process for producing watertight, vapor-permeable and flame-retardant coatings by mechanically foaming the coating composition to produce a stable foam, applying the foam to a woven, knitted or non-woven support material on one or both of the sides and drying it at a temperature of from 60° to 80° C. and optionally, after drying, compressing the foam layer. The textile support materials coated with the coating composition are suitable for use in building protection and in the geotextile sector.

U.S. Pat. No. 3,945,962, De Paul, granted Mar. 23, 1976, discloses a water base, hardenable coating composition for use on the inner or air conducting surfaces of fibrous glass thermal insulation employed in heating, cooling or ventilating conduits. The coating comprises, by weight: 70% to 90% of aluminum or magnesium hydrate; 5 to 20% of a binder such as vinyl acrylic latex or polyethylene vinyl acetate latex; and 1 to 10% of a flame retardant such as a sodium borate or boric acid.

Chinese Patent No. 1,076,947, People's Republic of China, Oct. 6, 1993, discloses compositions comprising vinyl acetal modified acrylic or acrylate emulsions 23–28, organic nitrides as the curing crosslinker selected from melamine, glycine, guanidine, dicyanamide or urea 13–17, carbon sources selected from pentaerythritol, starch or dextrin 10–14, blowing agents selected from $(NH_4)_3PO_4$, ammonium phosphate, $HN_4H_2PO_4$, naborate or $(NH_4)_2SO_4$ 18–22, fillers selected from barium metaborate, mica powder, talc, Kaolin, ZnO, titanium white or $Al(OH)_3$ 2–5, flame retardants selected from Mg-rich montmorillonite, quartz powder, borax or zirconium oxide 8–12 wt. % and balance water. The materials are of heat-insulation and can be used as decorative coating.

U.S. Pat. No. 4,539,045, Wagner, granted Sep. 3, 1985, discloses non-blooming fire retardant compositions comprising an ammonium phosphate-containing fire retardant and an effective amount of boric acid or an alkali metal borate. The ammonium phosphate-containing fire retardant preferably comprises the reaction mixture of aqueous phosphoric acid and an alkylene oxide. Preferably, the boric acid or alkali metal borate is present in an amount of from about 2.5% to about 12% by weight of solids in the phosphate-containing fire retardant. Such compositions are less susceptible to exudation of the fire retardant from treated wood panels during drying of the panels at elevated temperatures, and are particularly suitable for use in continuous treatment processes.

U.S. Pat. No. 5,151,127, Thompson, discloses several compositions that purport to combine the properties of being both an effective wood preservative and a fire retardant, while simultaneously being resistant to weather and leaching. These compositions are water-based and contain borax. Further, these compositions are applied to wood and cellulose products by spraying, brushing, rolling, pouring dipping, immersing or pressure impregnation, depending upon the material being treated and the purpose for which it is intended. The compositions disclosed in U.S. Patent No. 5,151,127 consist of various mixtures and proportions of the components listed in the table in column 2, lines 1–15. The specific recipes for compositions I–IX are listed in tabular form starting at column 3, line 49. The compositions disclosed do not contemplate the use of a liquid polytetrafluoroethylene suspension (i.e. durapel), nor specific steps of a method to prepare the fire retardant suspension.

U.S. Pat. No. 5,430,081, Ohmae et al., granted Jul. 4, 1995, discloses a flame retardant thermoplastic resin composition which comprises (A) 50 to 90% by weight of a thermoplastic resin which is the base polymer and 50 to 10% by weight of a total of (B) a nitrogen-containing condensed phosphoric acid compound, (C) a comb-like polymer consisting of a polyethylene main chain and a polyoxyalkylene side chain and (D) a metal-containing compound having a carbonization accelerating effect, the amounts of the components (B), (C) and (D) being 5 to 49% by weight, 1 to 15% by weight and 0 to 10% by weight, respectively, in which the total amount of the components (B), (C) and (D) is 100% by weight; a process for producing the composition; a flame-retardant consisting of the components (B), (C) and (D); and a process for producing the flame-retardant.

SUMMARY OF INVENTION

The invention is directed to a stabilized borate suspension useful for providing fire retardancy to a substrate comprising: (a) a liquid polyacrylate suspension; (b) a liquid polytetrafluoroethylene suspension; (c) a borate powder; (d) a liquid vinyl acetate co-polymer suspension; and (e) sufficient water to incorporate components (a), (b), (c) and (d) to form an emulsion.

The suspension can contain 16 oz. of liquid polyacrylate suspension, 6 oz. of polytetrafluoroethylene suspension, 8 oz. of borate powder, 2 oz. of vinyl acetate co-polymer and 160 oz. of water. The borate powder can be borax.

The invention is also directed to a method of preparing a borate containing fire retardant suspension comprising: (a) mixing a liquid polyacrylate suspension with a liquid polytetrafluoroethylene suspension in a first container; (b) mixing a borate powder and water in a second container; (c) mixing the mixed contents of the first container with the mixed contents of the second container and adding liquid vinyl acetate co-polymer suspension to the resulting mixture; and (d) continuing mixing of the combined mixtures until a smooth emulsion suspension is obtained.

In the method, 16 oz. of liquid polyacrylate suspension and 6 oz. of liquid polytetrafluoroethylene suspension can be mixed together in the first container for about 10 to 15 minutes and 8 oz. of borate powder and 160 oz. of water can be mixed together in the second container for about 15 to 20 minutes.

The mixed contents of the first and second containers can be combined and 2 oz. of liquid vinyl acetate co-polymer suspension can be added to the first and second mixtures after they are combined. The resulting combined mixture can be mixed together for 15 to 20 minutes to obtain a smooth consistent liquid emulsion.

The mixture according to the invention can be used to coat a substrate to impart fire retardant properties. The liquid emulsion mixture can be applied to a substrate by using a spray technique, a brush technique or a pressure treatment technique. The liquid emulsion mixture can be applied to the surface of a wood article.

DETAILED DESCRIPTION OF SPECIFIC EMBODIMENTS OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

It has been known for years that borax (bisodium borate, $Na_2B_4O_7 \cdot 10H_2O$), can be used as a fire retardant and preservative for a wide variety of articles, including wood and polymers. A problem with using borax for these purposes is that it is highly hygroscopic which makes it difficult to apply and is susceptible to water leaching. It is also difficult to stabilize the borax so that leaching of the borate from the substrate is avoided or minimized.

We have discovered a recipe and a method of stabilizing borax so that it is effective as a fire retardant for various articles and resists leaching from the article. The recipe is set out as follows:

Allwood Ecoseal Flame n'Aqua Shield Recipe

- 1 lb. wt. Stowechem—S702S (a polyacrylate polymer-liquid suspension), available from Stowechem;
- 6 oz. wt. Durapel (a polytetrafluoroethylene [Teflon] suspension in liquid form), available from DuPont;
- 8 oz. of borate powder (available from U.S. Borax);
- 2 oz. white all-purpose wood glue, a vinyl acetate copolymer available from LePage's;
- 160 oz. water.

Method of Preparation

To prepare the stabilized borax mixture (Allwood Ecoseal—Flame n'Aqua Shield™) for application to or incorporation in a substrate to be fire retarded or waterproofed, the S702S and the Durapel suspensions are mixed together in a first container for about 10 to 15 minutes.

In a second container, 8 oz. of borax and 160 oz. of water are mixed together for 15 to 20 minutes.

Then, the water-borax mixture in the second container is added to the S702S-Durapel mixture in the first container or vice versa. Finally, the 2 oz. of Lepage's all-purpose white glue is added to the combined mixture. The resulting mixture is then mixed for a further 15 to 20 minutes. This borax mixture has a thin milk-like appearance and has a long shelf life.

The mixture is applied to the article to be waterproofed and fire retarded, for example, wood shingles or siding, by either dipping the article in the mixture, pressure treating the article under standard pressure treatment techniques, brushing or rolling the mixture on the surface of the article, or spraying the mixture onto the surface of the article. The mixture can also be used to give a polymer fire retardant properties by incorporating the mixture into the polymer in its fluid state, before forming the solidified plastic article.

The mixture is suitable for application to all rigid, semi-rigid and flexible substrates, including kiln dried wood, fabrics and other articles. Preferably, the substrate is of a cellulose type, for example, wood or cotton.

Allwood Ecoseal Flame n'Aqua Shield Physical Characteristics

Colourless: Flame n'Aqua Shield does not stain or discolour wood. The wood retains its original colour and qualities.

Odourless: Flame n'Aqua Shield is suitable for indoor usage. It does not require ventilation. It is suitable for application in existing occupied areas and no special pre-treatment is required.

Environmentally safe:

Flame n'Aqua Shield can be safely used in inhabited and food preparation areas. No restriction is required on its use around humans, plants or pets.

Fire retardant:

A wood panel treated with Flame n'Aqua Shield will with-stand a flame with a temperature of 704° C. for a significant period of time, even after undergoing a ten year weathering cycle.

Resists fungi and bacteria:

Flame n'Aqua Shield is resistant to most forms of micro-organisms.

Water based:

Flame n'Aqua Shield does not have a petroleum base and therefore does not leave an oil residue. It is compatible with a variety of materials and surfaces.

Does not alter the physical properties of the treated article:

The Flame n'Aqua Shield used in treating wood does not crystallize or render the wood inflexible or weakened. Treated wood retains all its strength and physical characteristics. No special accommodations are required for weight, strength or support.

A number of tests have been conducted on articles treated with the mixture to assess the stability and properties of the article.

EXAMPLE 1

Allwood Ecoseal Flame n'Aqua Shield Treated Cedar Shingles

Six samples of Flame n'Aqua Shield treated cedar shingle were subjected to accelerated weather exposure testing. Six panels were cut to fit the test holders (four at 3"×12" and two at 3"×6") and the cut edges were coated with Flame n'Aqua Shield to keep out moisture. The panels were weighed and placed under test exposure on an ATLAS UVCon apparatus according to test ASTM G53. The tests were conducted for twenty-one days. The test samples were cycled at four hours ultraviolet light exposure at a panel temperature of 60° C. and four hours of condensation exposure at a panel temperature of 40° C. The tests on the six panels were conducted for 500 hours.

Observations

Visual inspections were made daily with no changes in the samples apparent until approximately the 400 hour mark where some white or lightened streaks were observed on one panel. The panels were re-weighed after 96 hours at ambient laboratory temperature and humidity. Each panel showed a weight loss ranging from 2.92% to 3.48% with an average of 3.22%. This could be accounted for by loss of moisture, some fibre loss and possibly some leaching or degradation of the surface coating.

EXAMPLE 2

A long term testing program of Flame n'Aqua Shield was undertaken. The objective of the testing program was to determine the long term effectiveness of the Flame n'Aqua Shield fire retardant material on a typical cedar shingle roof application. Eight sample test decks were constructed, treated, conditioned and tested using different concentrations of Flame n'Aqua Shield and treatment processes. One of the eight decks was treated with a spray-on application of Flame n'Aqua Shield containing approximately 25% borax solution.

A testing program was carried out to determine the effectiveness of the fire retardant material after undergoing weathering in the rain test conditioning chamber as described in ASTM E 108-91a. A set of twenty test panels (1.17 m.×1.07 m.) of class 1 taper sawn shakes was constructed. Two coats of Flame n'Aqua shield, containing approximately 25% borax solution, were spray applied to the test panel at the rate of 200 sq. ft/gallon over the test panel. Following two days of air curing, the test panels were transferred to a weathering chamber for the rain test.

The test panels were placed at $4/12$ slope in the weathering chamber and subjected to twelve one-week weathering cycles, each consisting of 96 hours of water exposure and 72 hours of drying time at 60° C. Following the completion of the rain test, the test panels were allowed to air dry in order to reduce the moisture content in the shingles to about 12% wt. range before proceeding with the various fire tests.

The weathered test panels were tested for Spread of Flame, Flying Brand, Intermittent Flame and Burning Brand tests following the similar test methodology for Class C exposure. With the exception of the Burning Band test, where one out of the twenty panels burnt through the test sample deck after 1.25 hours of fire exposure, the weathered test panels satisfied the requirements of Class C exposure for the Spread of Flame, Flying Brand and Intermittent Flame tests as prescribed in ASTM E 108-91a. Failure of the burning brand test in the one instance was probably due to uneven spray application of Flame n'Aqua Shield over the one test panel or insufficient curing time before the test panel was subjected to rain test.

Spread of Flame Test

A flame with a temperature of 704±28° C. was applied to a Flame n'Aqua Shield treated panel for a period of four minutes. An average air velocity of 5.3±1.0 m/s was maintained at each of the three locations as detailed in ASTM E 108-93 Section 4.4.2. The specimen was tested to the Class C standard in accordance with ASTM E 108-93 Section 8.3, but modified as detailed below.

The following is a list of modifications to the ASTM #108-93 Spread of Flame test:

| ASTM E 108-93 | Modifications of ASTM E 108-93 Spread of Flame Test |
|---|---|
| Burner | High capacity propane torch |
| 4.0 foot length of test deck | 1.17 m length of test deck |
| Air introduced by blower | Air introduced by 2 fans |

Flying Brand Test

A flame with a temperature of 704±28° C. was applied to the same inclined test specimen as mentioned in the Spread of Flame Test ASTM E 108-93 for a period of four minutes. An average air velocity of 5.3±1.0 ms was maintained at each of the three locations. detailed in ASTM E 108-93 Section 4.4.2. The specimen was tested to the Class C standard in accordance with ASTM E 108-93 Section 10.3, but modified as detailed below.

The following is a list of modifications to the ASTM E 108-93 Flying Brand Test:

| ASTM E 108-93 | Modifications of ASTM E 108-93 Flying Brand Test |
|---|---|
| Burner | High capacity propane torch |
| Air introduced by blower | Air introduced by 2 fans |

Intermittent Flame Test

A flame with a temperature of 704±28° C. was applied in three cycles to the same inclined test specimen. Each cycle consisted of a flame on for one minute and off for two minutes. An average air velocity of 5.3±1.0 m/s was maintained at each of the three locations detailed in ASTM E 108-93 Section 4.4.2. The specimen was tested to the Class C standard in accordance with ASTM E 108-93 Sections 7.3 and 7.4, but modified as detailed below.

The following is a list of modifications to the ASTM E 108-93 Intermittent Flame Test:

| ASTM E 108-93 | Modifications of ASTM E 108-93 Intermittent Flame Test |
|---|---|
| Burner | High capacity propane torch |
| Air introduced by blower | Air introduced by 2 fans |

Burning Brand Test

The burning brand test panels were prepared in accordance with ASTM E 108-93 Sections 9.3.3 and 9.4.3. The specimens were placed on the same test specimen in accordance with ASTM E 108-93 Sections 9.5.3 and 9.5.3.1. An average air velocity of 5.3±1.0 m/s was maintained at each of the three locations detailed in ASTM E 108-93 Section 4.4.2. The test was allowed to continue until all evidence of flame, glow, and smoke had disappeared. The specimen was tested to the Class C standard in accordance with ASTM E 108-93 Section 9.6, but modified as detailed below.

| ASTM E 108-93 | Modifications of ASTM E 108-93 |
|---|---|
| No. 18 B & S gage soft iron wire | Tie wire |
| Air introduced by blower | Air introduced by 2 fans |

The Spread of Flame and Flying Brand Tests were conducted simultaneously. These tests were followed by the Intermittent Flame Test which was followed by the Burning Brand Test. All the tests were conducted on the same test specimen. Calibration of flame temperature and air velocity were performed prior to each test. Checks were also made on the flame temperature and air velocity throughout the duration of the tests.

Summary of Testing of Flame n'Aqua Shield
Fire Retardant Treated Cedar Shingles After Weathering

| TYPE OF TEST | TEST RESULT | PASS/FAIL | OVERALL RESULT |
|---|---|---|---|
| Spread of Flame | | | Does not meet the requirements of Class C roof covering material (ASTM E 108-91 a) but it was probably due to faulty application of the Flame n' Aqua Shield fire retardant. |
| Total Fire/Smoke Duration | 6 minutes | Pass | |
| Area Affected/Charred | 10" × 4.5" | | |
| Flying Brand | | | |
| Number of Flying Brands | Nil | Pass | |
| Intermittent Flame | | | |
| Total Fire/Smoke Duration | 7.5 minutes | Pass | |
| Area Affected/Charred | 10" × 5" | | |
| Burning Brand | | | |
| Total Fire/Smoke Duration | 1 hr. 15 minutes | One failure; others passed | |
| No. of Brands Extinguished | 19 | | |

Conclusion

Based on the test data collected during the testing program it is concluded that proper fire retardant treatment of cedar shingles using Flame n'Aqua Shield (FAS) containing 25% borax solution will enable the shingles to meet the requirements of ASTM E 108-91a for Class C fire exposure after weathering.

After subjecting the test sample to the weathering test for three months, stabilized fire retardant concentration tests were conducted on the sample and it was noted that very little of the stabilized borax had leached from the test sample. Close microscopic inspection of the sample indicated that the stabilized borax mixture had chemically bonded with water molecules in the cellulose fibre, thus resisting hygroscopic action and leaching of the stabilized borax mixture from the wood substrate.

The viscosity of the stabilized borax solution according to the invention can be varied from a viscosity similar to water to a viscosity resembling thick syrup. This can be done by varying the concentration of the water, used as a thinner. The stabilized borax emulsion according to the invention has a long shelf life.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A stabilized borate suspension useful for providing fire retardancy to a substrate comprising:
    (a) a liquid polyacrylate suspension;
    (b) a liquid polytetrafluoroethylene suspension;
    (c) a borate powder;
    (d) a liquid vinyl acetate co-polymer suspension; and
    (e) sufficient water to incorporate components (a), (b), (c) and (d) to form an emulsion.

2. A suspension as claimed in claim 1 wherein the total suspension contains 16 oz. of liquid polyacrylate suspension, 6 oz. of polytetrafluoroethylene suspension, 8 oz. of borate powder, 2 oz. of vinyl acetate co-polymer and 160 oz, of water.

3. A suspension as claimed in claim 1 wherein the borate powder is borax.

4. A process of preparing a borate containing fire retardant suspension comprising:

(a) mixing a liquid polyacrylate suspension with a liquid polytetrafluoroethylene suspension in a first container;
    (b) mixing a borate powder and water in a second container;
    (c) mixing the mixed contents of the first container with the mixed contents of the second container and adding liquid vinyl acetate co-polymer suspension to the resulting mixture; and (d) continuing mixing of the combined mixtures until a smooth emulsion suspension is obtained.

5. A process as claimed in claim 4 wherein a total of 16 oz. of liquid polyacrylate suspension and 6 oz. of liquid polytetrafluoroethylene suspension are mixed together in the first container as a first mixture for about 10 to 15 minutes.

6. A process as claimed in claim 5 wherein a total of 8 oz. of borate powder and 160 oz. of water are mixed together in the second container as a second mixture for about 15 to 20 minutes.

7. A process as claimed in claim 6 wherein the total mixed contents of the first and second containers are combined and 2 oz. of liquid vinyl acetate co-polymer suspension is added to the first and second mixtures after they are combined.

8. A process as claimed in claim 7 wherein the resulting total combined mixture is mixed together for 15 to 20 minutes to obtain a smooth consistent liquid emulsion.

9. A process of imparting fire retardancy properties to a substrate which comprises coating the substrate with a stabilized borate suspension as claimed in claim 1.

10. A process of imparting fire retardancy properties to a substrate which comprises coating the substrate with a stabilized borate suspension as claimed in claim 2.

11. A process as claimed in claim 8 wherein the liquid emulsion mixture is applied to a substrate by using a spray technique, a brush technique or a pressure treatment technique.

12. A process as claimed in claim 8 wherein the liquid emulsion mixture is applied to the surface of a wood article.

* * * * *